(12) United States Patent
Ohishi

(10) Patent No.: US 6,333,783 B1
(45) Date of Patent: Dec. 25, 2001

(54) DISTANCE MEASURING SYSTEM

(75) Inventor: Masahiro Ohishi, Tokyo-to (JP)

(73) Assignee: Kabushiki Kaisha Topcon, Tokyo-to (JP)

(*) Notice: Subject to any disclaimer, the term of this patent is extended or adjusted under 35 U.S.C. 154(b) by 0 days.

(21) Appl. No.: 09/557,852

(22) Filed: Apr. 26, 2000

(30) Foreign Application Priority Data

May 21, 1999 (JP) .................................................. 11-142327

(51) Int. Cl.⁷ .................................................. G01C 03/08
(52) U.S. Cl. ............................................................. 356/4.01
(58) Field of Search ..................................... 356/4.01, 375

(56) References Cited

U.S. PATENT DOCUMENTS

| | | | |
|---|---|---|---|
| 4,611,911 | * | 9/1986 | Kadomatsu ............................. 356/5 |
| 5,760,905 | | 6/1998 | Sasagawa .............................. 356/375 |

* cited by examiner

Primary Examiner—Mark Hellner
(74) Attorney, Agent, or Firm—Nields & Lemack

(57) ABSTRACT

A distance measuring system, wherein the distance measuring unit comprises a reflection light beam optical path leading to a photodetection unit, the photodetection unit 7 for receiving a reflection light beam from an object to be measured, an optical member provided on the optical path of the reflection light beam and used for deflecting the reflection light beam toward the photodetection unit, and a deflector 50 arranged on a surface of the optical member and used for deflecting the reflection light beam tilted with respect to the normal optical path toward the photodetection unit.

7 Claims, 6 Drawing Sheets

DISTANCE MEASURING SYSTEM

BACKGROUND OF THE INVENTION

The present invention relates to a distance measuring system for measuring a distance using light wave, and in particular, to a distance measuring system, by which the distance can be measured both when a reflection prism is mounted on an object to be measured and when it is not mounted.

A distance measuring system using light wave is a system, which can measure a distance from a measuring position to an object to be measured by projecting a range-finding light beam toward the object to be measured and by receiving a reflection light beam reflected by the object to be measured. In general, it is divided to two types: a distance measuring system which requires a reflection prism (a corner cube) on the object to be measured, and a non-prism distance measuring system which can measure the distance without a reflection prism. However, the arrangement and the process from light emission to photodetection is approximately the same in these two types of the system.

Referring to FIG. 6, description will be given below on an essential portion of the distance measuring system.

The distance measuring system comprises an optical unit 1 for projecting and receiving a range-finding light beam and an electrical unit (not shown) for converting the received range-finding light beam to an electric signal and for calculating the distance. The optical unit 1 for projecting and receiving the range-finding light beam comprises a light emitting unit for emitting a range-finding light beam 3' from a light source 2, a projecting optical system 5 for projecting the range-finding light beam 3 from the light emitting unit toward an object to be measured 4, a photodetection optical system 6 for guiding a reflection light beam 3' from the object to be measured 4, and a photodetection unit 7 for receiving the reflection light beam 3' guided by the photodetection optical system 6.

When the range-finding light beam (a pulsed laser beam or a modulated laser beam) 3 is emitted from the light source 2 (such as a semiconductor laser) and it is deflected by a projection side half-mirror 10, a rotary shading disk 11, and a reflection mirror 12, it is directed toward an objective lens 13, which serves as a projection optical system. After being turned to the approximately parallel beam by the objective lens 13, the range-finding light beam 3 is projected toward the object to be measured 4 (the reflection prism) via the objective lens 13. After being reflected by the object to be measured 4, the reflection light beam 3' is directed toward the objective lens 13 again. Being directed toward the objective lens 13, the reflection light beam 3' is focused by the objective lens 13 and is deflected by the reflection mirror 12. After passing through a light quantity attenuation filter 14 and a photodetection side half-mirror 15, the beam forms an image on the photodetection unit 7 and is received. The light quantity attenuation filter 14 has a range-finding laser beam attenuation filter on the outer periphery and a reference laser beam attenuation filter on the inner portion, and the density is gradually changed in the circumferential direction.

After being emitted from the light source 2, the laser beam is divided and reflected by the projection side half-mirror 10, and it is deflected by a reflection mirror 17 as a reference light beam 16. After passing through the rotary shading disk 11, a pair of relay lenses 18 and 19, and the light quantity attenuation filter 14, it is reflected by a deflection mirror 21 and enters the photodetection unit 7.

The rotary shading disk 11 is rotated and driven by a motor 23 and selectively shades the light beam so that the reference light beam 16 and the range-finding light beam 3 as separated by the projection side half-mirror 10 alternately enter the photodetection unit 7. The reference light beam is used to correct an internal error in the distance measuring system.

After being reflected by the object to be measured 4, the reflection light beam 3' reaches and is received by the photodetection unit 7 via the objective lens 13, the reflection mirror 12 and the light quantity attenuation filter 14. In order to avoid the influence of the changes the photodetection light quantity to the photodetection characteristics, the light quantity attenuation filter 14 is rotated by a motor 24, and transmitting positions of the range-finding light beam 3 and the reflection light beam 3' are changed with respect to the light quantity attenuation filter 14. As a result, the light quantity is adjusted so that the reflection light beam 3' entering the photodetection unit 7 has constant photodetection light quantity.

On the photodetection unit 7, the reference light beam 16 with its photodetection light quantity adjusted by the light quantity attenuation filter 14 is received. The electrical unit (not shown) converts the range-finding light beam 3 and the reference light beam 16 to electric signals, and the distance to the object to be measured 4 is calculated from these two electric signals.

FIG. 7(A) shows the condition of optical paths of the range-finding light beam 3 and the reflection light beam 3' when the object to be measured 4 is a prism (or when a prism is mounted on the object to be measured).

The reflection light beam received by the photodetection unit 7 is basically the same as the projected range-finding light beam, and it is separated to the projection optical system 5 and the photodetection optical system 6 by the reflection mirror 12. In case of a type of the system generally used where the single objective lens 13 is commonly used by the projection optical system 5 and the photodetection optical system 6, the objective lens 13 is separated into upper and lower parts or into left and right parts, or into central part and outer peripheral part for the projection optical system and the photodetection optical system. This arrangement is the same in an electronic theodolite with a built-in distance measuring system. When a distance to a corner cube positioned at short distance is measured by the distance measuring system as described above, a deviation occurs between the projected range-finding light beam 3 and the reflection light beam 3' as shown in FIG. 7(A). For this reason, even when the projection optical system 5 including the light source 2 and the photodetection optical system 6 including the photodetection unit 7 may not be positioned on the same axis, the distance can be measured.

On the other hand, FIG. 7(B) shows a case where the object to be measured 4' is a low-retroreflection sheet (made of very small spherical glass pieces) or a natural object (having a certain reflection characteristic).

When the reflection sheet or the natural object is used as the object to be measured 4', the range-finding light beam 3 projected to the object to be measured 4' is turned to the reflection light beam 3', which is diffused around a projected position J1. In this respect, the diffused reflection light beam 3' from the object to be measured 4' entering the photodetection optical system 6 is tilted with respect to the optical axis of the objective lens 13. Thus, it is deviated from the photodetection unit 7, and it is difficult to form an image. When an image is formed at a position away from the photodetection unit 7, the substantial light quantity received on the photodetection unit 7 is extremely decreased, and it is difficult to measure the distance. This causes more problems in case of the non-prism distance measurement, in which the reflection sheet or the natural object is used as the object to be measured 4' and there is no discriminative selection on the object. When the non-prism distance measurement is performed for long distance measurement, no problem occurs because the reflection light beam 3' enters the photodetection optical system 6 almost in parallel. However, the reflection light quantity itself is substantially decreased, and the distance cannot be measured. Therefore, the non-prism distance measurement is adopted for the measurement of the short distance. In case of the short distance measurement, the tilting of the reflection light beam as described above becomes an issue.

For this reason, the countermeasures as shown in FIG. 8(A) and FIG. 8(B) have been taken in the past.

Specifically, a prism 26 for compensation or a compensating lens 27 are provided on the optical paths between the objective lens 13 and the object to be measured 4'. These compensating optical means are added to the optical system in case of the non-prism distance measurement, and a part of the reflection light beam diffused by the object to be measured 4' is directed to the photodetection unit 7 to form an image.

However, the mounting of the above prism 26 or the compensating lens 27 for each short distance measurement means lower working efficiency. Also, the components for compensation must be separately provided, and this leads to the problem of the increased manufacturing cost. Further, there is also a problem in that the image of collimation is turned to dual images.

SUMMARY OF THE INVENTION

It is an object of the present invention to provide a distance measuring system, by which it is possible to measure a long distance as well as a short distance by a single system, to reduce the cost of the additional components for compensation, to achieve the system in compact size and with lightweight construction, and further, to improve ease of operation of the system.

To attain the above object, the distance measuring system according to the present invention comprises a distance measuring unit, wherein the distance measuring unit comprises a reflection light beam optical path leading to a photodetection unit, the photodetection unit for receiving a reflection light beam from an object to be measured, an optical member provided on the optical path of the reflection light beam and used for deflecting the reflection light beam toward the photodetection unit, and a deflector arranged on a surface of the optical member and used for deflecting the reflection light beam tilted with respect to the normal optical path toward the photodetection unit. Also, the present invention provides the distance measuring system as described above, wherein the deflector is disposed on a reflection surface for reflecting the reflection light beam toward the photodetection unit. Further, the present invention provides the distance measuring system as described above, wherein the deflector is disposed on a transmitting surface for transmitting the reflection light beam. Also, the present invention provides the distance measuring system as described above, wherein, the more the deflector is shifted away from the normal optical path, the more the deflection is increased. Further, the present invention provides the distance measuring system as described above, wherein, the more the deflector is shifted away from the normal optical path, the smaller the width thereof becomes. Also, the present invention provides the distance measuring system as described above, wherein the deflector is a reflection surface. Further, the present invention provides the distance measuring system as described above, wherein the deflector is diffraction means. Also, the present invention provides the distance measuring system as described above, wherein the deflector is a Fresnel lens. Further, the present invention provides the distance measuring system as described above, wherein there is further provided a reflection mirror for reflecting a range-finding light beam toward the object to be measured and for reflecting a reflection light beam from the object to be measured toward the photodetection unit, and the deflector is arranged on a reflection surface of the reflection mirror for reflecting the reflection light.

DETAILED DESCRIPTION OF THE PREFERRED EMBODIMENT

Figure 1:
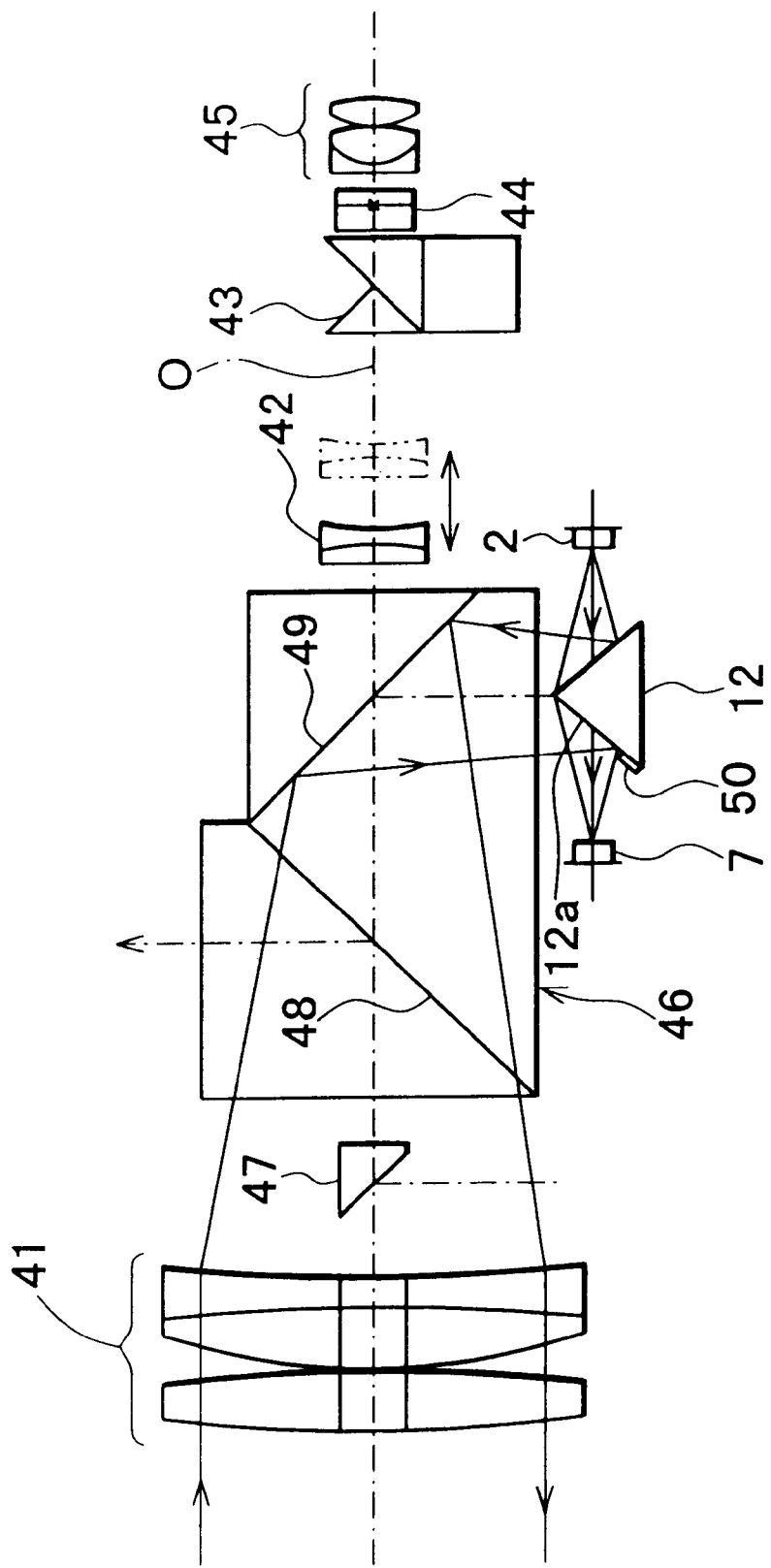
FIG. 1 is a block diagram of an optical system of an embodiment of the present invention.

Descriptions will be given below on an embodiment of the present invention referring to the drawings.

In the following descriptions, explanations will be given on a distance measuring system, which is incorporated in an automatic survey instrument or a survey instrument which has the problems as described above.

Figure 5:
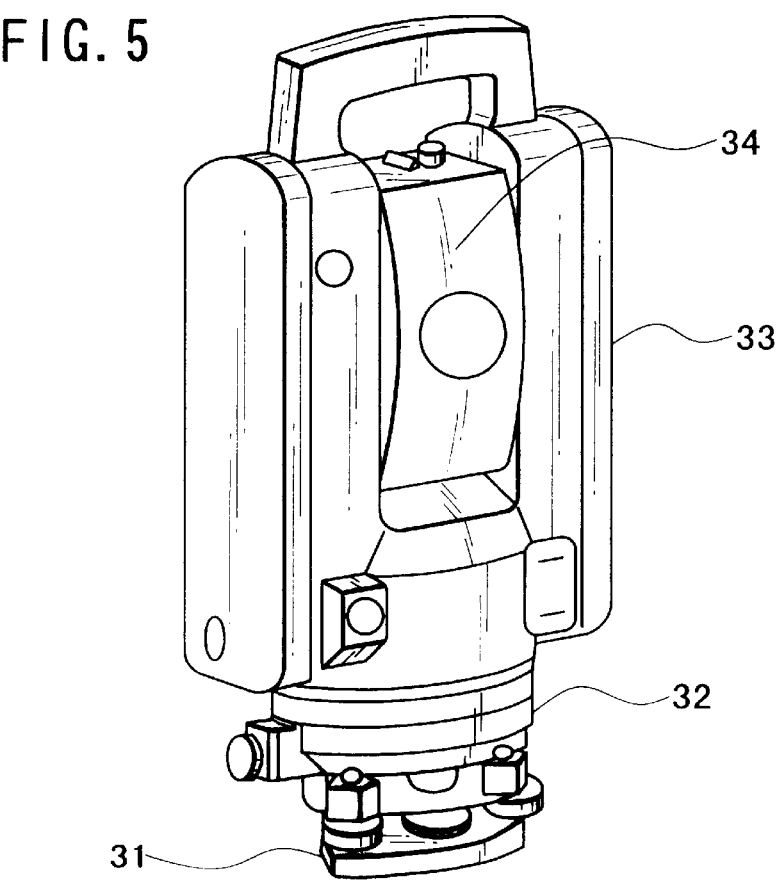
FIG. 5 is a perspective view of an essential portion of an automatic survey instrument, to which the present invention is applied.

FIG. 5 shows an essential portion of an automatic survey instrument. Like a survey instrument commonly in use, the automatic survey instrument comprises a leveling unit 31 mounted on a tripod, a base unit 32 placed on the leveling unit 31, a base stand 33 rotatably disposed around a vertical axis on the base unit 32, and a telescope unit 34 rotatably mounted around a horizontal axis on the base stand 33. Further, in the automatic survey instrument, the base stand 33 and the telescope unit 34 are rotated and driven by a built-in motor (not shown), and these components can be operated by a remote-control or an automatic control operation.

On the telescope unit 34, in addition to a collimation optical system, a distance-measuring optical system for measuring distance and a tracking optical system for collimating and tracking a target object are integrally provided.

From the integrally designed optical system, a range-finding light beam and a tracking light beam are projected, and an operator performs collimation. The range-finding light beam and the tracking light beam are designed to have different wavelength ranges so that no confusion occurs between tracking and distance measuring operations. In this respect, the light beam entering the telescope unit 34 is divided into each wavelength range depending upon the purposes such as the range-finding light beam, the tracking light beam or the collimation light beam. As a result, distance measurement and automatic tracking are carried out. The division of wavelength ranges is performed by optical means, which is arranged on an optical path of the optical system of the telescope unit 34. As dividing means for dividing the light beam to a plurality of light components with different wavelength ranges, a dichroic prism is used in most cases. Descriptions will be given now on an optical arrangement of the automatic survey instrument, in which the light beam is divided into three light components with different wavelength ranges, referring to FIG. 1.

The optical system comprises an objective lens 41, a focusing lens 42, an erect prism 43, a focus mirror 44, and an ocular lens 45. A dichroic prism 46 serving as dividing means is disposed between the objective lens 41 and the focusing lens 42. Further, a reflection mirror 47 for projecting the tracking light beam is arranged between the objective lens 41 and the dichroic prism 46.

The focusing lens 42 is arranged movably on an optical axis O, receives the incident light beam and forms an image on the focus mirror 44. The erect prism 43 turns the image to an erect image. The focus mirror 44 has a scale to align the target object to the center of collimation, and the ocular lens 45 focuses the image formed on the focus mirror 44 together with the scale on the focus mirror 44 on a retina of a survey operator. On the reflection light optical axis of the reflection mirror 47, a tracking optical system (not shown) is disposed, and the tracking light beam is projected to the target object via the reflection mirror 47. The dichroic prism 46 comprises a first dichroic mirror surface 48 for reflecting the tracking light beam and a second dichroic mirror surface 49 for reflecting the range-finding light beam. A tracking light beam photodetection unit (not shown) is arranged at a position opposite to the first dichroic mirror surface 48, and a distance measuring unit is disposed at a position opposite to the second dichroic mirror surface 49.

Figure 6:
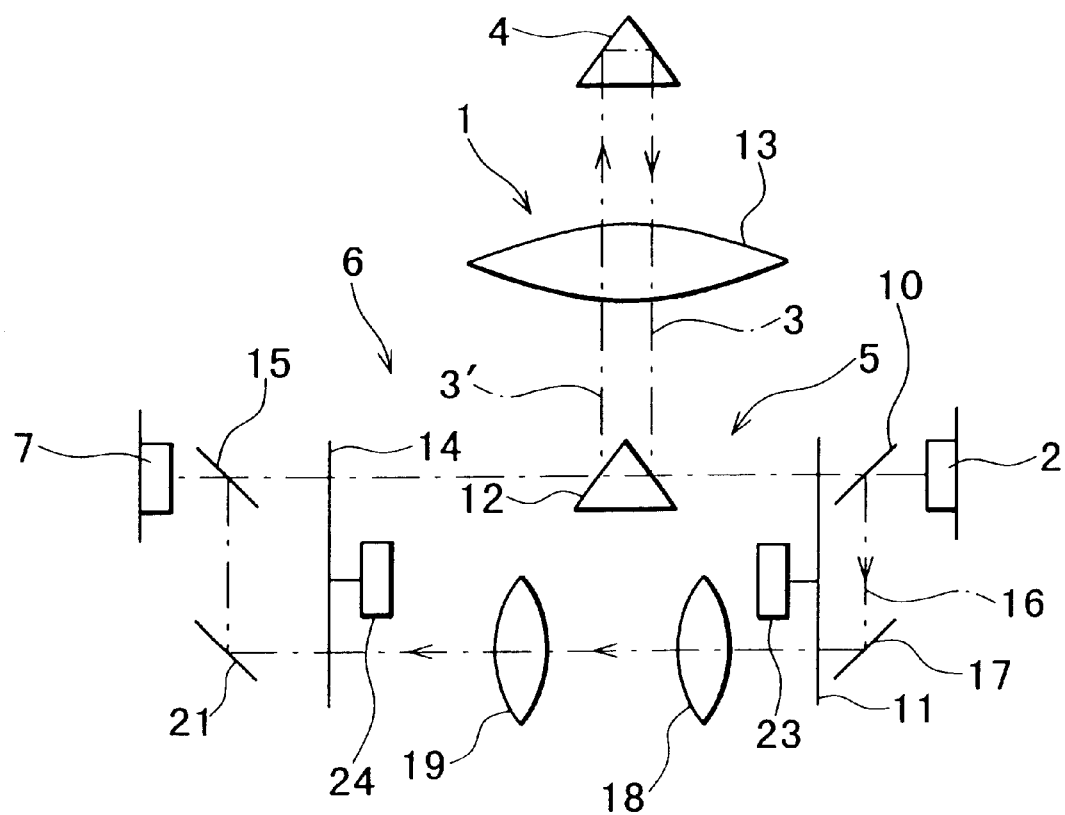
FIG. 6 is a block diagram of a conventional type distance measuring optical system.
Figure 7A:
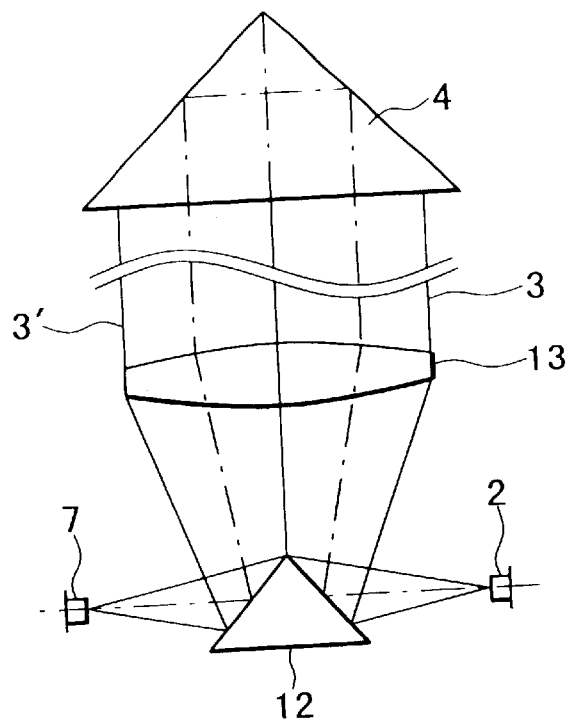
FIG. 7(A) and FIG. 7(B) each represents relationship between a distance measuring unit and an object to be measured in a conventional system.
Figure 7B:
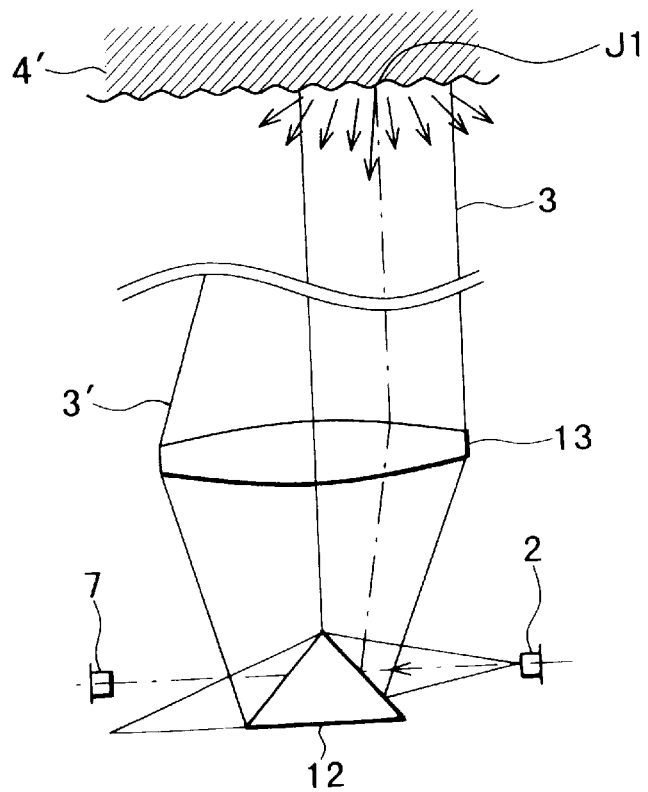
Figure 8A:
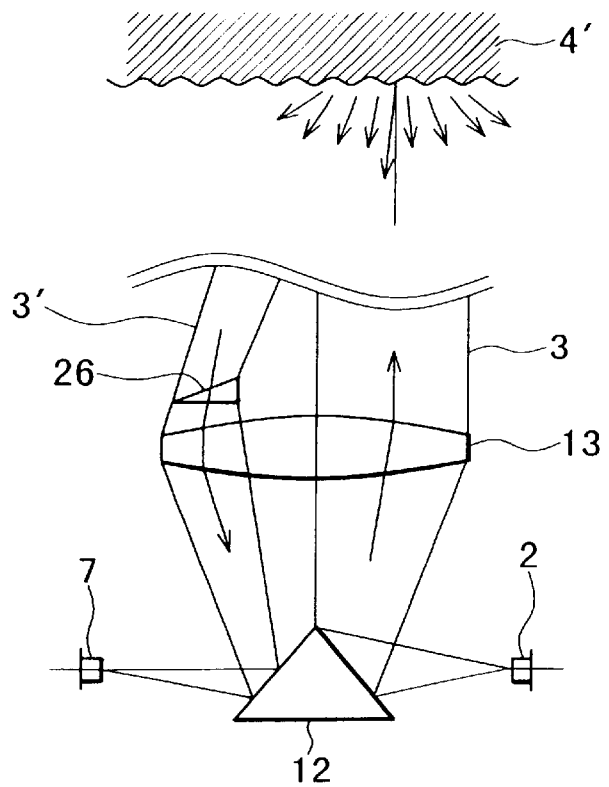
FIG. 8(A) and FIG. 8(B) each represents relationship between a distance measuring unit and an object to be measured in a conventional system.
Figure 8B:
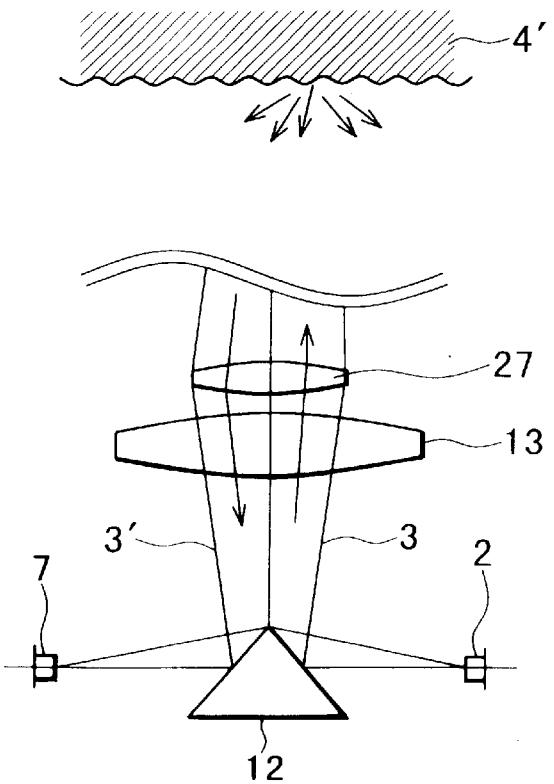

The distance measuring unit comprises a reflection mirror 12 arranged at a position to face the second dichroic mirror surface 49, a light source 2 and a photodetection unit 7, the latter two components sandwiching the reflection mirror 12 between them. The distance measuring unit has the same optical system as shown in FIG. 6, while it is not shown in FIG. 1.

A deflector 50 is arranged on the reflection mirror 12, i.e. on a part of the reflection mirror covering an area from a position (i.e. a position deviated from the optical axis of the photodetection unit 7) in contact with the normal photodetection optical path (i.e. reflection optical path in case the object to be measured 4 is a prism) of the reflection mirror to one end of the reflection mirror 12 (in the figure, to the bottom surface of the reflection mirror 12). The deflector 50 deflects the reflection light beam toward the photodetection unit 7 in case the entering reflection light beam is tilted with respect to the optical axis of the photodetection unit 7.

Figure 2A:
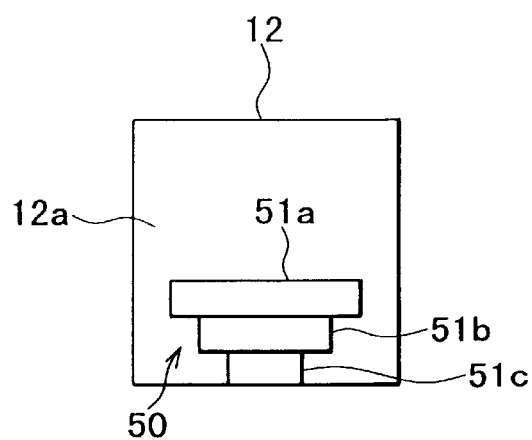
FIG. 2(A) and FIG. 2(B) each represents an essential portion of the above embodiment of the present invention.
Figure 2B:
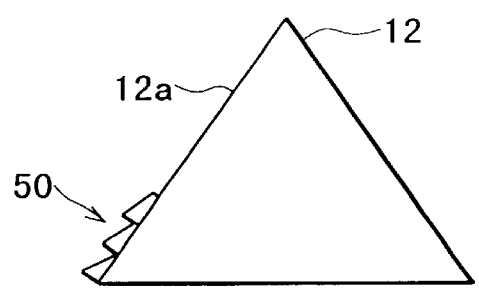

Now, referring to FIG. 2(A) and FIG. 2(B), the deflector 50 is described.

As it is evident from FIG. 1, before it is reflected from the second dichroic mirror surface 49, the incident light beam contains the visible light beam for collimation in addition to the range-finding light beam. Accordingly, when the deflector is provided, the image to be collimated is deviated, and the image is turned to dual images. In order to prevent the deviation, it should be arranged on the optical path of the range-finding light beam after it is separated on the second dichroic mirror surface 49. Deflection members 51a, 51b, 51c, . . . are attached on a reflection surface 12a. Similarly to the reflection surface 12a, a reflection surface for deflection is formed by depositing aluminum or the like by vacuum evaporation. The deflection members 51a, 51b, 51c, . . . are designed in wedge-like shape. The more it is deviated from the normal optical path, the more the reflection surface is tilted, and the more the area of the reflection surface is reduced. This is attributable to the following reason: When the object to be measured 4' is a low-retroreflection sheet (e.g. made of very small spherical glass pieces) or a natural object (having a certain reflection characteristic), the closer the object to be measured 4' is located, the more the reflection light beam is tilted with respect to the optical axis of the photodetection unit 7, and the more the light quantity is. In case of short distance measurement, the reflection light quantity of the range-finding light beam is high, and the light quantity is sufficient for measurement even when reflection surface area of the deflector 50 is small. On the contrary, at a position where the reflection light beam is closer to the normal optical path, it is designed in such manner that the reflection area is large and sufficient light quantity can be obtained because the object to be measured 4' is located at some distance. In this case, the short distance measurement is defined as a measurement at a distance of about 10 m or less.

In the following, descriptions will be given on the operation of the system.

As described above, the range-finding light beam 3 to be projected contains light components with different wavelength ranges, i.e. light beams for collimation, for tracking and for distance measurement. A visible light beam of 400 to 650 nm is used for collimation, an infrared light beam of 650 nm is used for tracking, and an infrared light beam of 800 nm is used for distance measurement.

When the reflection light beam enters and passes through the objective lens 41, the tracking light beam is reflected from the first dichroic mirror surface 48. After the laser beam passes through the first dichroic mirror surface 48, the range-finding light beam is further reflected by the second dichroic mirror surface 49, and the light beam is separated to the range-finding light beam and the visible light beam. The range-finding light beam thus separated is received by the range-finding optical system, and the distance is measured. After the visible light beam passes through the second dichroic mirror surface 49, it is observed by the survey operator via the ocular lens 45.

Next, photodetecting condition of the reflection light beam and the photodetection unit 7 will be described.

First, descriptions will be given on a case where the object to be measured 4 is a prism. The condition of the reflection light beam shown in FIG. 1 represents the case where the object to be measured 4 is a prism. The optical axis of the reflection light beam reflected by the reflection surface 12a is identical or almost identical with the optical axis of the photodetection unit 7, and the photodetection unit 7 can receive the light quantity enough for the measurement. In this case, a part of the reflection light beam is reflected by the deflector 50 and does not reach the photodetection unit 7. However, the part reflected by the deflector 50 is the peripheral part of the light beam. The reflection light quantity when the prism is used is sufficiently high, and there is no problem.

Figure 4:
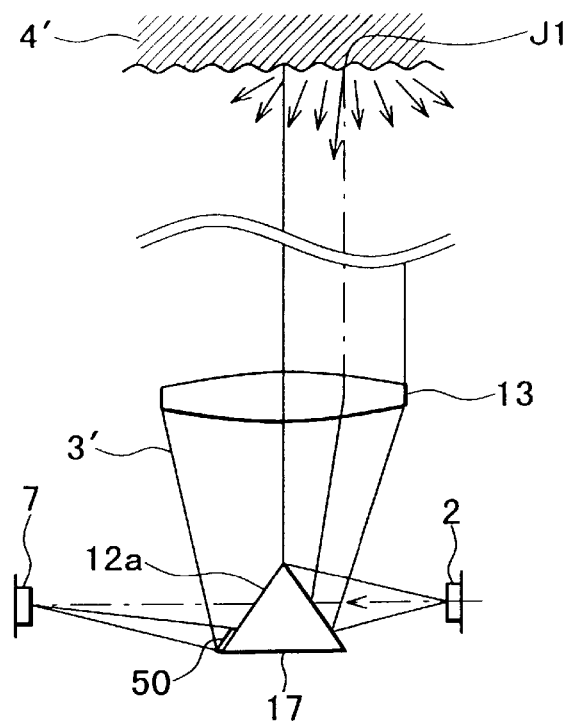
FIG. 4 is a drawing to explain relationship between a distance measuring unit and an object to be measured.

Next, referring to FIG. 4, descriptions will be given on a case where the object to be measured 4' is a low-retroreflection sheet (made of very small spherical glass pieces) or a natural object (having a certain reflection characteristic). FIG. 4 shows relationship between the distance measuring unit and the object to be measured.

When reflected by the object to be measured 4', the reflection light beam 3' is diffused, and besides the optical path is tilted. For this reason, the optical axis of the reflection light beam 3' reflected by the reflection surface 12a is tilted with respect to the optical axis of the photodetection unit 7, and the reflection light beam does not enter the photodetection unit 7 almost at all. A part of the reflection light beam 3' is reflected toward the photodetection unit 7 by the deflector 50 and enters the photodetection unit 7. The photodetection unit 7 converts the reflection light beam 3' reflected by the deflector 50 to an electric signal, and the distance to the object to be measured 4' is measured by the distance measuring unit.

As described above, the closer the object to be measured 4' is located, the more the reflection light beam 3' is tilted with respect to the optical axis of the photodetection unit 7, and the more the light quantity is. The more distant the object is located, the more the reflection light beam is directed closer to parallel to the optical axis, and the less the light quantity becomes. The more the light beam is deviated from the normal optical path, the more the reflection surface is tilted, and the more the area of the reflection surface is reduced. As a result, the photodetection unit 7 can receive the light quantity sufficient for the survey operation.

The reflection mirror 17 is substantially separated from the dichroic prism 46, and the position can be adjusted much easier. Further, the reflection mirror 17 itself is designed in a simple shape and in a smaller size as an optical component, and it can be easily manufactured at low cost and the mirror can be easily fabricated by the process such as vacuum evaporation.

Figure 3A:
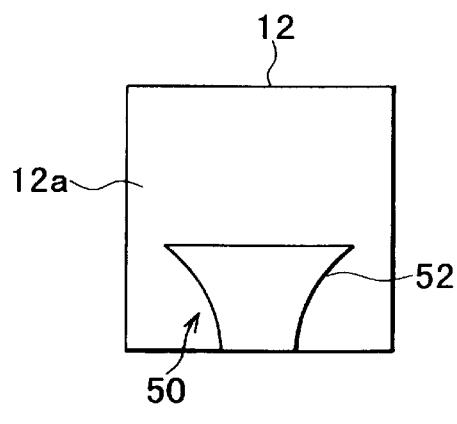
FIG. 3(A) and FIG. 3(B) each represents another example of the essential portion of the embodiment of the present invention.
Figure 3B:
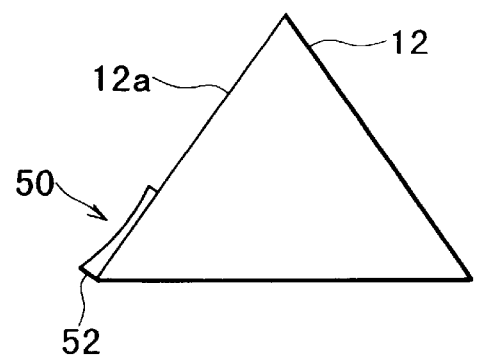

Referring to FIG. 3(A) and FIG. 3(B), descriptions will be given on another type of the deflector 50.

As shown in FIG. 3, a deflection member 52 attached on the deflector 50 is designed in such manner that tilting of the reflection surface is continuously increased, i.e. the more it is deviated from the optical axis of the photodetection unit 7, the more the tilting of the reflection surface is continuously increased, and the more the width of the reflection surface is reduced. On the surface of the deflection member, metal is attached by vacuum evaporation to use it as a reflection surface. The deflection member 52 has such a shape that the light quantity of the reflection light beam 3' entering the photodetection unit 7 is not extensively changed even when the distance to the object to be measured 4' is varied. When this type of the deflector 50 is used, the light quantity sufficient for the measurement can be received regardless of the distance to the object to be measured 4'.

The deflector 50 may be provided on a surface of the dichroic prism 46 facing to the reflection mirror 12. In this case, the transmission light beam is deflected. Further, the deflection means may be composed of diffraction means, Fresnel lens, a plurality of wedge prisms, etc. In the above, descriptions have been given in case of an automatic survey instrument. Also, in a survey instrument having distance measuring unit, the above solution means is basically required except that the dichroic prism 46 is used instead of the dichroic prism for dividing the light beam to the collimation light beam and the range-finding light beam.

According to the present invention, in the distance measurement, regardless of whether the object to be measured has or does not have a reflection prism, the measurement can be carried out immediately without changing the component arrangement of the distance measuring system. Good workability is ensured and manufacturing cost of the system can be reduced because it will be sufficient for the purpose so far as a deflector with simple design and construction is provided on the range-finding optical system.

What is claimed is:

1. A distance measuring system comprising an optical system integrally having a distance measuring optical system for receiving a range finding beam reflected from an object to be measured and a collimation optical system for collimating said object to be measured, a distance measuring unit having a photodetection unit for receiving said range finding beam, a range finding beam optical path leading said range finding beam from said optical system toward said photodetection unit, and a dividing means for dividing said range finding beam out of the light beams entering said optical system, wherein said distance measuring unit comprises an optical member provided on said range finding beam optical path and having a reflection surface for reflecting said range finding beam divided by said dividing means toward said photodetection unit, and a deflector arranged on said reflection surface and used for deflecting said divided range finding beam tilted with respect to the normal optical path toward said photodetection unit.

2. A distance measuring system according to claim 1, wherein, the more said deflector is shifted away from the normal optical path, the more the deflection is increased.

3. A distance measuring system according to claim 2, wherein, the more said deflector is shifted away from the normal optical path, the smaller a reflection width thereof becomes.

4. A distance measuring system according to one of claims 2 or 3, wherein said deflector consists of a plurality of wedged shaped members.

5. A distance measuring system according to claim 7, wherein said deflector is a diffraction means which increases the deflection of the transmitted light beam the more said deflector is shifted away from the normal optical path.

6. A distance measuring system according to claim 7, wherein said deflector consist of a plurality of prisms which the more the deflection of the transmitted light beam increases, the more said deflector is shifted away from the normal optical path.

7. A distance measuring system comprising an optical system integrally having a distance measuring optical system for receiving a range finding beam reflected from an object to be measured and a collimation optical system for collimating said object to be measured, a distance measuring unit having a photodetection unit for receiving said range finding beam, a range finding beam optical path leading said range finding beam from said optical system toward said photodetection unit, and a dividing means having a transmitting surface for dividing said range finding beam out of the light beams entering said optical system and for transmitting the divided range finding beam, wherein said distance measuring unit comprises an optical member provided on said range finding beam optical path and having a reflection surface for reflecting said range finding beam divided by said dividing means toward said photodetection unit, and said transmitting surface comprises a deflector used for reflecting said transmitted range finding beam tilted with respect to the normal optical path toward said photodetection unit.

* * * * *